H. S. GRACE.
RESILIENT VEHICLE WHEEL.
APPLICATION FILED JULY 29, 1912.

1,072,604.

Patented Sept. 9, 1913.

WITNESSES:

INVENTOR.
Henry S. Grace
BY M. R. Seely
ATTORNEY

UNITED STATES PATENT OFFICE.

HENRY S. GRACE, OF SAN FRANCISCO, CALIFORNIA.

RESILIENT VEHICLE-WHEEL.

1,072,604.  Specification of Letters Patent.  Patented Sept. 9, 1913.

Application filed July 29, 1912. Serial No. 712,194.

*To all whom it may concern:*

Be it known that I, HENRY S. GRACE, a citizen of the United States, residing in the city and county of San Francisco, State of California, have invented certain new and useful Improvements in Resilient Vehicle-Wheels, of which the following is a specification.

My invention relates to resilient vehicle wheels, and particularly to those used in motor vehicle construction.

The object of my invention is to provide a resilient wheel for rolling and traction purposes that possesses the same properties of shock absorption as the air-filled tire now in common use.

The high price of the standard pneumatic tire, its liability to puncture and the cost of repairs, are a constant source of danger annoyance and expense to all owners and operators of motor driven vehicles. In my invention all the above objectionable features are eliminated without the loss of the one desirable feature, the resiliency or the shock absorbing property.

In addition to the above described advantages my invention may be equipped and used with a metallic tread, desirable in motor vehicles of the heavy traction type, or shod with a rubber tread of the solid variety which insures quiet running as well as good traction in the lighter pleasure vehicles.

Figure 1:
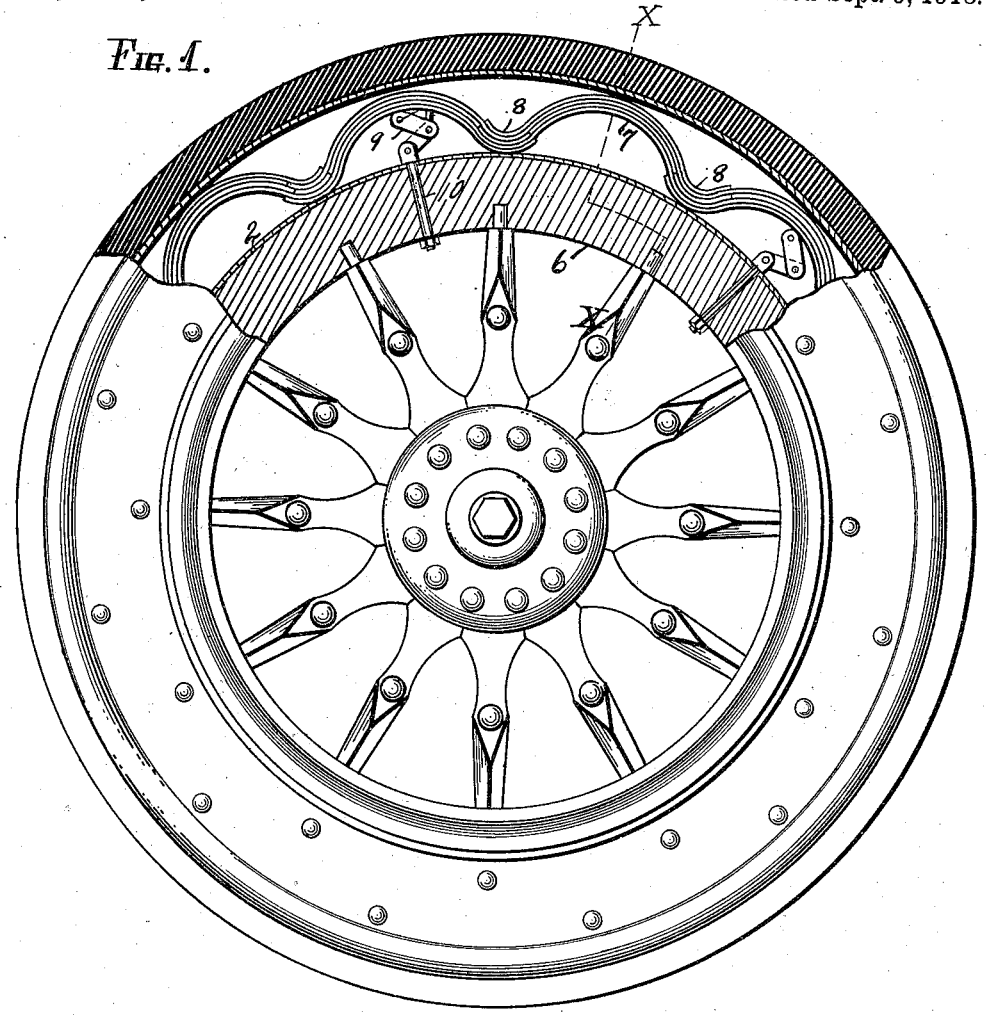
Figure 2:
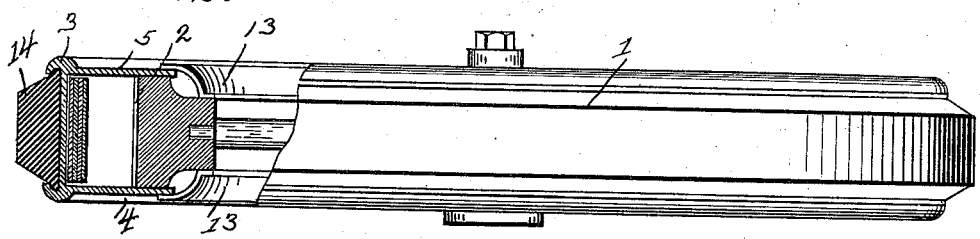

My invention is illustrated in the accompanying drawings in which,

Figure 1, is an open view in elevation of the wheel with a broken section. In this view are shown the assembly of the arcuated overlapping springs with upturned ends, the driving toggles, and spacing studs. The face plate and dust protectors are removed. Fig. 2, is a cross-section taken on the section line X—X, Fig. 1.

The numeral 1, is used to designate a vehicle wheel whose felly is shod with the metallic rim 2, of suitable weight and material to securely bind the same upon the spokes thereof.

3, is a channel rim, preferably of the ordinary clencher type, to which is rigidly secured the back plate 4; 5, is the detachable face plate completing the main features of the housing containing the operating mechanism.

6, is the metallic shod felly slidably mounted within the housing, and between the back plate 4, and the face plate 5. The difference between the peripheral diameter of the metallic shod felly and the internal diameter of the channel rim provides a suitable space for the assembly of the arcuated overlapping springs, 7, 7, with their upturned articulating ends 8, 8. Assembled within the arc of said springs, and in sufficient number to transmit the power applied thereto, are the driving toggles 9, one end thereof being secured to the felly by means of the yoke-end bolt 10, and the other end to the spacing stud 11; the said stud being the means of retaining and securing the detachable face plate 5, to the back plate 4, of the channel rim.

To prevent the dust or water entering the housing and injuring the mechanism therein contained, the guards 13, 13, are provided; the said guards are of any suitable material having the necessary flexibility to stand the constant movement to which they are subjected while the wheel is in motion. The inner edges of the dust guards referred to, are attached to the lower part of the felly, while the outer edges thereof are secured to the inner edge of the back plate 4 on one side, and to the detachable face plate 5 on the other side of the housing. This provides a dust and water tight connection between the moving parts required.

To insure quiet running as well as perfect traction, the solid rubber shoe 14 is provided. To prevent the shoe from being demounted by side thrust or centrifugal force, the clencher sides are provided on the rim 3.

My device is not only suitable for the lighter pleasure vehicles, equipped in the above described manner, but is adaptable to the use of the heavy traction type known as the truck or tractor. For this purpose it may be equipped with the solid steel tire in place of the clencher rims with their rubber shoe.

I do not wish to be understood as confining myself to the precise construction shown herein, but wish to avail myself of any modifications that may fall properly within the scope of my invention.

Having thus described my invention, what I claim as new and desire to secure by Letters Patent, is:—

In a resilient wheel, the combination with inner and outer concentric rims, of a plurality of sets of springs having curved central portions for sustaining the pressure of the outer rim, each of said sets comprising a plurality of alternately arranged superimposed long and short leaves, the long leaves having curved end portions overlapping the end portions of the long springs of the next adjoining set.

In testimony whereof, I affix my signature in presence of two witnesses.

HENRY S. GRACE.

Witnesses:
O. A. EGGERS,
WILLIS GRANT MURRAY.

Copies of this patent may be obtained for five cents each, by addressing the "Commissioner of Patents, Washington, D. C."